(12) United States Patent
Liu et al.

(10) Patent No.: US 12,546,993 B2
(45) Date of Patent: Feb. 10, 2026

(54) VIRTUAL IMAGE DISPLAY DEVICE

(71) Applicant: DENSO CORPORATION, Kariya (JP)

(72) Inventors: Heng Liu, Kariya (JP); Jyunya Yokoe, Kariya (JP); Kenta Futamura, Obu (JP)

(73) Assignee: DENSO CORPORATION, Kariya (JP)

( * ) Notice: Subject to any disclaimer, the term of this patent is extended or adjusted under 35 U.S.C. 154(b) by 743 days.

(21) Appl. No.: 17/872,924

(22) Filed: Jul. 25, 2022

(65) Prior Publication Data

US 2022/0357576 A1 Nov. 10, 2022

Related U.S. Application Data

(63) Continuation of application No. PCT/JP2021/006712, filed on Feb. 23, 2021.

(30) Foreign Application Priority Data

Mar. 13, 2020 (JP) ................. 2020-044315

(51) Int. Cl.
   *G02B 27/01* (2006.01)
   *B60K 35/22* (2024.01)
   (Continued)

(52) U.S. Cl.
   CPC .......... *G02B 27/0101* (2013.01); *B60K 35/22* (2024.01); *B60K 35/60* (2024.01);
   (Continued)

(58) Field of Classification Search
   CPC ............... G02B 27/0101; G02B 3/08; G02B 2027/011; G02B 5/1876; G02B 5/1895; G02B 3/0043; B60K 35/60; B60K 35/22
   See application file for complete search history.

(56) References Cited

U.S. PATENT DOCUMENTS

| 5,418,583 A | * | 5/1995 | Masumoto ......... G03B 21/2026 353/38 |
| 2005/0041307 A1 | | 2/2005 | Barone |

(Continued)

FOREIGN PATENT DOCUMENTS

| JP | 2006019027 A | 1/2006 |
| JP | 4918769 B2 | 4/2012 |

(Continued)

*Primary Examiner* — Thomas K Pham
(74) *Attorney, Agent, or Firm* — Harness, Dickey & Pierce, P.L.C.

(57) ABSTRACT

A virtual image display device includes a light source, an image member, a Fresnel lens array having an array structure of Fresnel lens units. Each of the Fresnel lens units includes divided lens surfaces that commonly curve convexly or concavely. The array structure includes eccentric Fresnel lens units as the Fresnel lens units. The divided lens surfaces have curvature centers offset from an individual center axis line. Each of the eccentric Fresnel lens units has an offset amount defined as a distance of the curvature centers from the individual center axis line. The offset amount of the eccentric Fresnel lens unit having a larger value of the inter-axis distance between the overall reference axis line and the individual center axis line is greater than the offset amount of the eccentric Fresnel lens unit having a smaller value of the inter-axis distance.

11 Claims, 9 Drawing Sheets

(51) Int. Cl.
*B60K 35/60* (2024.01)
*G02B 3/00* (2006.01)
*G02B 3/08* (2006.01)

(52) U.S. Cl.
CPC ............ *G02B 3/0043* (2013.01); *G02B 3/08* (2013.01); *G02B 2027/011* (2013.01)

(56) References Cited

U.S. PATENT DOCUMENTS

| | | |
|---|---|---|
| 2016/0282617 A1 | 9/2016 | Asai |
| 2021/0278663 A1 | 9/2021 | Nambara |

FOREIGN PATENT DOCUMENTS

| | | | | |
|---|---|---|---|---|
| JP | 5881184 B2 | 3/2016 | | |
| JP | 2017215571 A | * 12/2017 | ............ | B60K 35/00 |
| JP | 2019045605 A | 3/2019 | | |
| WO | WO-2009057696 A1 | * 5/2009 | ............... | G02B 3/08 |
| WO | WO-2016092724 A1 | 6/2016 | | |

\* cited by examiner

FIG. 16

VIRTUAL IMAGE DISPLAY DEVICE

CROSS-REFERENCE TO RELATED APPLICATIONS

The present application is a continuation application of International Patent Application No. PCT/JP2021/006712 filed on Feb. 23, 2021, which designated the U.S. and claims the benefit of priority from Japanese Patent Application No. 2020-044315 filed on Mar. 13, 2020. The entire disclosures of all of the above applications are incorporated herein by reference.

TECHNICAL FIELD

The disclosure according to this specification relates to the display of a virtual image.

BACKGROUND ART

A virtual image display device includes an illumination light source, an image member, a first lens, and a second lens. The first lens is a single-surface lens having a single refractive surface on the surface on both sides. The second lens is a lens array having an array structure in which a plurality of lens units are arrayed.

SUMMARY

According to one mode discloses herein, a virtual image display device displays a virtual image by projecting light of an image onto a projection portion. The virtual image display device includes:
  a light source that emits light;
  an image member that forms the image by partially shielding the light; and
  a Fresnel lens array arranged in an optical path between the light source and the image member and having an array structure in which a plurality of Fresnel lens units are arrayed, each of the plurality of Fresnel lens units having an individual area.

An overall reference axis line is defined as a virtual center line of the array structure that passes through the array structure, and an individual center axis line is defined as a center line of the individual area that is parallel to the overall reference axis line and passes through the individual area Each of the plurality of Fresnel lens units includes a plurality of divided lens surfaces. The plurality of divided lens surfaces curve convexly or the plurality of divided lens surfaces curve concavely.

The array structure includes a plurality of eccentric Fresnel lens units as the plurality of Fresnel lens units. The plurality of divided lens surfaces of each of the plurality of eccentric Fresnel lens units have curvature centers that are offset from the individual center axis line toward an overall reference axis side of the individual center axis line that is close to the overall reference axis line or an opposite side of the individual center axis line that is away from the overall reference axis line.

Each of the plurality of eccentric Fresnel lens units has an offset amount that is defined as a distance of the curvature centers from the individual center axis line. An inter-axis distance is defined as a distance between the overall reference axis line and the individual center axis line. The offset amount of one of the plurality of eccentric Fresnel lens units having a larger value of the inter-axis distance is greater than the offset amount of another one of the plurality of eccentric Fresnel lens units having a smaller value of the inter-axis distance.

DESCRIPTION OF EMBODIMENTS

To begin with, examples of relevant techniques will be described.

A virtual image display device includes an illumination light source, an image member, a first lens, and a second lens. The illumination light source provides illumination light. The image member blocks at least a part of the illumination light to form an image on the display screen. The first lens is a single-surface lens having a single refractive surface on the surface on both sides. The second lens is a lens array having an array structure in which a plurality of lens units are arrayed.

As described above, the single-surface lens and the lens array are provided as separate components, and the illumination performance is enhanced by a combination of these lenses. However, there is a concern that the build of the virtual image display device becomes large.

An object of the disclosure of this specification is to provide a virtual image display device in which enlargement of the build is suppressed while achieving high illumination performance.

According to one mode discloses herein, a virtual image display device displays a virtual image by projecting light of an image onto a projection portion. The virtual image display device includes:
  a light source that emits light;
  an image member that forms the image by partially shielding the light; and
  a Fresnel lens array arranged in an optical path between the light source and the image member and having an array structure in which a plurality of Fresnel lens units are arrayed, each of the plurality of Fresnel lens units having an individual area.

An overall reference axis line is defined as a virtual center line of the array structure that passes through the array structure, and an individual center axis line is defined as a center line of the individual area that is parallel to the overall reference axis line and passes through the individual area Each of the plurality of Fresnel lens units includes a plurality of divided lens surfaces. The plurality of divided lens surfaces curve convexly or the plurality of divided lens surfaces curve concavely.

The array structure includes a plurality of eccentric Fresnel lens units as the plurality of Fresnel lens units. The plurality of divided lens surfaces of each of the plurality of eccentric Fresnel lens units have curvature centers that are offset from the individual center axis line toward an overall reference axis side of the individual center axis line that is close to the overall reference axis line or an opposite side of the individual center axis line that is away from the overall reference axis line.

Each of the plurality of eccentric Fresnel lens units has an offset amount that is defined as a distance of the curvature centers from the individual center axis line. An inter-axis distance is defined as a distance between the overall reference axis line and the individual center axis line. The offset amount of one of the plurality of eccentric Fresnel lens units having a larger value of the inter-axis distance is greater than the offset amount of another one of the plurality of eccentric Fresnel lens units having a smaller value of the inter-axis distance.

According to such a mode, the Fresnel lens array having the array structure in which the plurality of Fresnel lens units are arrayed is provided between the illumination light source and the image member. Each of the plurality of Fresnel lens units includes a plurality of divided lens surfaces that curve convexly or concavely in the individual area. A local refraction action as if each individual center axis line is the optical axis is exhibited by the common curved shape while enlargement of the build of the lens array due to bulging out of the lens surface by division is suppressed.

The Fresnel lens unit includes a plurality of eccentric Fresnel lens units. Each of the plurality of eccentric Fresnel lens units has an offset amount, which is defined as a distance of the curvature centers from the individual center axis line, and the offset amount of one of the plurality of eccentric Fresnel lens units having a larger value of the inter-axis distance between the overall reference axis line and the individual center axis line is greater than the offset amount of another one of the plurality of eccentric Fresnel lens units having a smaller value of the inter-axis distance. That is, since the illumination light passing through the position away from the overall reference axis line receives a larger deflection action, the overall refracting function as if the overall reference axis line is the optical axis can be further exhibited by the assembly of the plurality of eccentric Fresnel lens units.

Since the same array structure exhibits both the local refracting function and the overall refracting function, an increase in the number of components is suppressed. As described above, enlargement in the build of the virtual image display device can be suppressed while achieving high illumination performance.

Hereinafter, a plurality of embodiments will be described with reference to the drawings. Note that the same reference numerals are given to corresponding components in each embodiment, and redundant description may be omitted.

When only a part of the configuration is described in each embodiment, the configuration of the other embodiment described above can be applied to other parts of the configuration. In addition, not only a combination of configurations explicitly described in the description of each embodiment but also configurations of a plurality of embodiments can be partially combined even if not explicitly described as long as there is no particular problem in the combination.

First Embodiment

Figure 1:
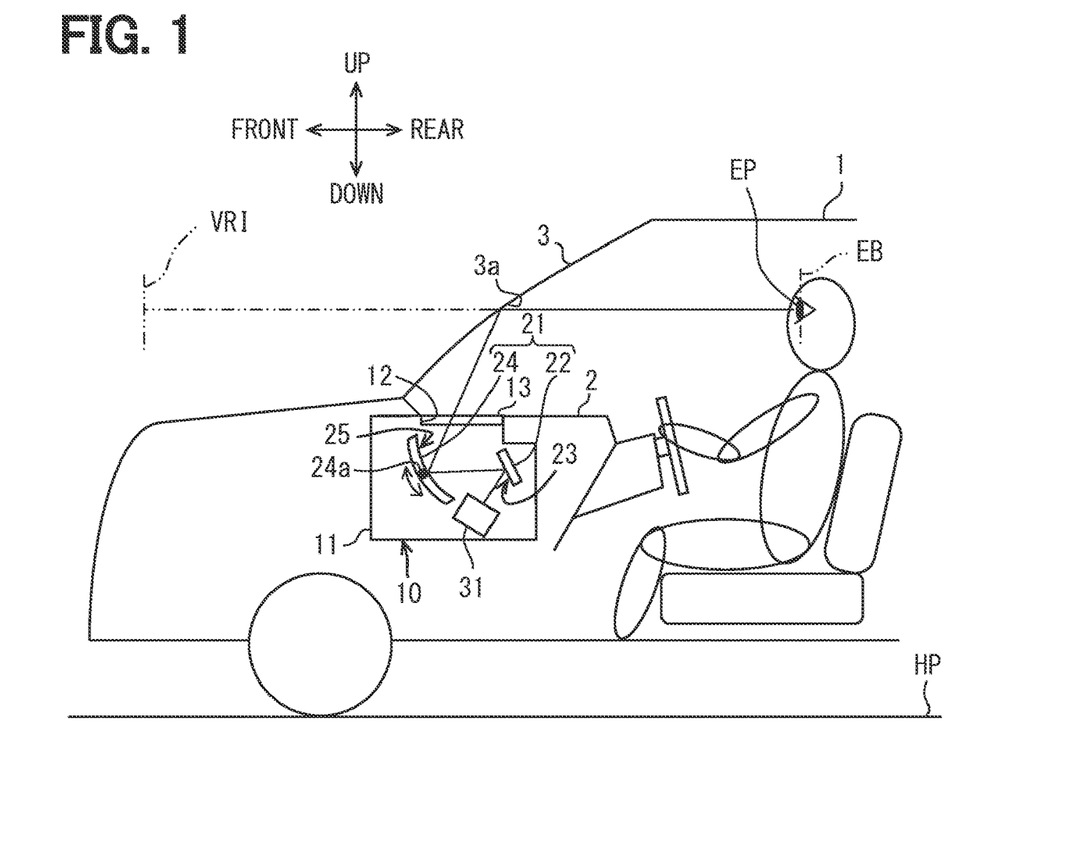
FIG. 1 is a diagram illustrating a state in which an HUD is mounted on a vehicle.

As illustrated in FIG. 1, a virtual image display device according to a first embodiment of the present disclosure is a head-up display (hereinafter, HUD) 10 used in a vehicle 1 and configured to be mounted on the vehicle 1. The HUD 10 is installed on an instrument panel 2 of the vehicle 1. The HUD 10 projects light toward a projection portion 3a provided on a windshield 3 of the vehicle 1. The light reflected by the projection portion 3a reaches a viewing region EB set in the interior of the vehicle 1. In this way, the HUD 10 displays a virtual image VRI visually recognizable from the viewing region EB in an exterior space on a side opposite to the viewing region EB with the windshield 3 in between.

Therefore, an occupant serving as a viewer who located an eye point EP in the viewing region EB can recognize various types of information displayed in the virtual image VRI. The various types of information to be displayed include, for example, information indicating the state of the vehicle 1 such as a vehicle speed, view aiding information, road information, and the like.

Hereinafter, unless otherwise specified, each direction indicated by front, back, up, down, left, and right is described with reference to the vehicle 1 on a horizontal plane H P.

The windshield 3 of the vehicle 1 is a transmissive member formed in a translucent plate shape using, for example, glass or synthetic resin. The windshield 3 is disposed above the instrument panel 2. The windshield 3 is disposed so as to be inclined such that a spacing between the windshield 3 and the instrument panel 2 increases from the front toward the back. The windshield 3 forms the projection portion 3a on which light is projected from the HUD 10 in a smooth concave surface shape or planar shape. The projection portion 3a is configured to surface-reflect light from the HUD 10.

Note that the projection portion 3a may be configured to reflect light toward the viewing region EB by diffractive reflection by the interference fringes instead of surface-reflection by providing a reflection type holographic optical element on the windshield 3. Further, the projection portion 3a may not be provided on the windshield 3. For example, a combiner separate from the vehicle 1 may be installed in the interior of the vehicle 1, and the projection portion 3a may be provided in the combiner.

The viewing region EB is a space region where the virtual image VRI displayed by the HUD 10 can be visually recognized so as to satisfy predetermined visibility (e.g., so that the entire virtual image VRI has predetermined luminance or more), and is also referred to as an eye box. The viewing region EB is set in the interior space of the vehicle 1. The viewing region EB is typically disposed so as to overlap with an eyellipse set in the vehicle 1. The eyellipse is set, for example, in the vicinity of the headrest of the driver's seat. The eyellipse is set for each of both eyes, and is set as an ellipsoidal virtual space based on an eye range statistically representing a spatial distribution of the eye point EP of the occupant (see also JISD0021: 1998 for details). The viewing region EB is arranged so as to include, for example, both of a pair of eyellipse corresponding to both eyes.

A specific configuration of the HUD 10 will be described below. The HUD 10 includes a housing 11, a light guide unit 21, a display 31, and the like.

The housing 11 is formed of, for example, synthetic resin or metal to have a light shielding property, and is installed in the instrument panel 2 of the vehicle 1. The housing 11 has a hollow shape that accommodates the light guide unit 21, the display 31, the control unit, and the like. The housing 11 has a window portion 12 that opens optically on an upper surface portion facing the projection portion 3a. The window portion 12 is covered with, for example, a dustproof sheet 13 capable of transmitting light formed as a virtual image VRI.

The light guide unit 21 guides the light emitted from the display 31 to the viewing region EB via the projection portion 3a. The light guide unit 21 includes, for example, a plane mirror 22 and a concave mirror 24. The plane mirror 22 has a reflecting surface 23 by, for example, forming a metal film of aluminum or the like by vapor deposition on a surface of a base material made of synthetic resin or glass. The reflecting surface 23 of the plane mirror 22 is formed in a smooth planar shape. The light entering the plane mirror 22 from the display 31 is reflected by the reflecting surface 23 toward the concave mirror 24.

The concave mirror 24 has a reflecting surface 25 by, for example, forming a metal film of aluminum or the like by vapor deposition on a surface of a base material made of synthetic resin or glass. The reflecting surface 25 of the concave mirror 24 is formed in a smooth concave surface shape by being curved to a concave shape. The light entering the concave mirror 24 from the plane mirror 22 is reflected by the reflecting surface 25 toward the projection portion 3a. Here, the size of the virtual image VRI is enlarged with respect to the size of the image on a display screen 56 of the display 31 by the reflecting surface 25 of the concave mirror 24 having positive optical power.

The light reflected by the concave mirror 24 is transmitted through the dustproof sheet 13 and emitted to the outside of HUD 10, and enters the projection portion 3a of windshield 3. When the light reflected by the projection portion 3a reaches the viewing region EB, the virtual image VRI can be viewed from the viewing region EB. Here, since the projection portion 3a is provided on the windshield 3 as a transmissive member, the virtual image VRI can be visually recognized while being superimposed on a scene exterior to the vehicle 1 visually recognized through the windshield 3.

The concave mirror 24 is turnable about a rotation shaft 24a extending in the left-right direction in accordance with driving of the actuator. By such turning, the display position of the virtual image VRI and the position of the viewing region EB can be adjusted to be displaced in the vertical direction.

Figure 2:
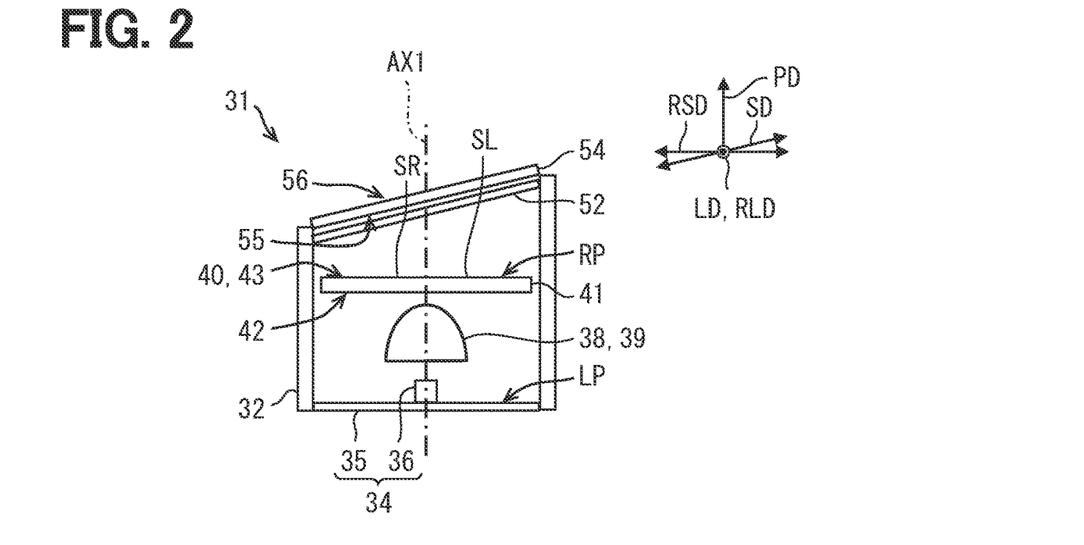
FIG. 2 is a diagram illustrating an overall image of a display.

The display 31 displays an image on a rectangular display screen 56, and emits light for forming an image as the virtual image VRI toward the light guide unit 21. As illustrated in FIG. 2, the display 31 of the present embodiment is a liquid crystal display. The display 31 includes a casing 32, a light source unit 34, a first lens member 38, a second lens member 41, a diffusion plate 52, an image member 54, and the like.

The casing 32 is formed in a box shape or a tubular shape having a light shielding property from, for example, synthetic resin or metal. A casing 32 interiorly accommodates the light source unit 34, the first lens member 38, the second lens member 41, and the diffusion plate 52. Accompanying therewith, in the casing 32, an opening window is formed at a position facing the plane mirror 22, and the image member 54 is arranged so as to close the opening window. The light source unit 34, the first lens member 38, the second lens member 41, and the diffusion plate 52 constitute a backlight for the image member 54.

The light source unit 34 is formed by mounting a plurality of illumination light sources 36 on a light source circuit substrate 35. The light source circuit substrate 35 is, for example, a flat plate-shaped rigid substrate using a synthetic resin such as glass epoxy resin as a base material. For the illumination light source 36 of the present embodiment, for example, a light emitting diode (LED) light source serving as a point light source is adopted.

Each illumination light source 36 is electrically connected to a power supply through a wiring pattern on the light source circuit substrate 35. Each illumination light source 36 is formed by sealing a chip-shaped blue light emitting diode with a yellow fluorescent body obtained by mixing a yellow fluorescent agent with a synthetic resin having light projecting property. The yellow fluorescent body is excited by the blue light emitted from the blue light emitting diode with the light emission intensity corresponding to the amount of current, and yellow light is emitted. Mixing of the blue light and the yellow light results in emission of white (more specifically, pseudo-white) illumination light from each illumination light source 36.

Here, each illumination light source 36 emits illumination light in a radiation angle distribution in which the light emission intensity relatively decreases as it is angularly diverged from a light emission peak direction PD in which the light emission intensity becomes maximum. The light emission peak directions PD of the respective illumination light sources 36 are directions common to each other and are perpendicular to the surface of the light source circuit substrate 35. As described above, the surface of the light source circuit substrate 35 is a planar light source arrangement surface LP on which each illumination light source 36 is arranged.

On the light source arrangement surface LP, the plurality of illumination light sources 36 are arranged side by side so as to be shifted at least in the longitudinal corresponding direction RLD out of the short corresponding direction RSD and the longitudinal corresponding direction RLD. In particular, in the present embodiment, the plurality of illumination light sources 36 are arrayed in a line at a predetermined array pitch along the longitudinal corresponding direction RLD.

Here, the short corresponding direction RSD means a direction in which a vector indicating the short direction SD of the display screen 56 is indicated by a vector projected onto the light source arrangement surface LP when the display screen 56 is projected onto the light source arrangement surface LP along the opposite direction of the light emission peak direction PD. Here, the longitudinal corresponding direction RLD means a direction in which a vector indicating the longitudinal direction LD of the display screen 56 is indicated by a vector projected onto the light source arrangement surface LP when the display screen 56 is projected onto the light source arrangement surface LP along the opposite direction of the light emission peak direction PD. If the display screen 56 is parallel to the light source arrangement surface LP, the short corresponding direction RSD coincides with the short direction SD, and the longitudinal corresponding direction RLD coincides with the longitudinal direction LD.

The first lens member 38 is disposed between the light source unit 34 and the second lens member 41 on the optical path between the light source unit 34 and the image member 54. The first lens member 38 is formed to have translucency by, for example, synthetic resin or glass. The first lens member 38 is a convex lens array in which convex lens elements 39 individually provided in one-to-one correspondence with the illumination light sources 36 are arrayed in accordance with the arrangement of the illumination light sources 36 on the light source arrangement surface LP.

In the present embodiment, the plurality of illumination light sources 36 are arrayed in a line along the longitudinal corresponding direction RLD. In correspondence therewith, the same number of convex lens elements 39 are provided so as to form a pair with the illumination light source 36. The plurality of convex lens elements 39 are arrayed in a line at a predetermined array pitch along the longitudinal corresponding direction RLD. The spacing between the convex lens element 39 and the illumination light source 36 that form a pair is set to be the same spacing for each pair.

Each convex lens element 39 is disposed to face the individually corresponding illumination light source 36, and collects the illumination light emitted from each illumination light source 36. Each convex lens element 39 has an incident side lens surface facing the illumination light source 36 side formed into a common smooth planar shape by the first lens member 38. On the other hand, in each convex lens element 39, the emission side lens surface facing the second lens member 41 side is an individual lens surface for each convex lens element 39 and is formed into a smooth convex surface shape curved convexly.

For example, in the present embodiment, the array pitch of the illumination light sources 36 and the array pitch of the convex lens elements 39 are set to the same pitch as each other. The optical axis of each convex lens element 39 is set along the light emission peak direction PD, and is set to pass through the individually corresponding illumination light source 36. Therefore, the illumination light emitted from each illumination light source 36 efficiently enters each individually corresponding convex lens element 39, and is refracted and collected.

The second lens member 41 is disposed between the first lens member 38 and the diffusion plate 52 on the optical path between the light source unit 34 and the image member 54. The second lens member 41 is formed to have translucency by, for example, synthetic resin or glass. The second lens member 41 has a macroscopically flat plate-shaped outer appearance shape. The second lens member 41 is disposed, for example, along the parallel direction of the light source arrangement surface LP.

Figure 3:
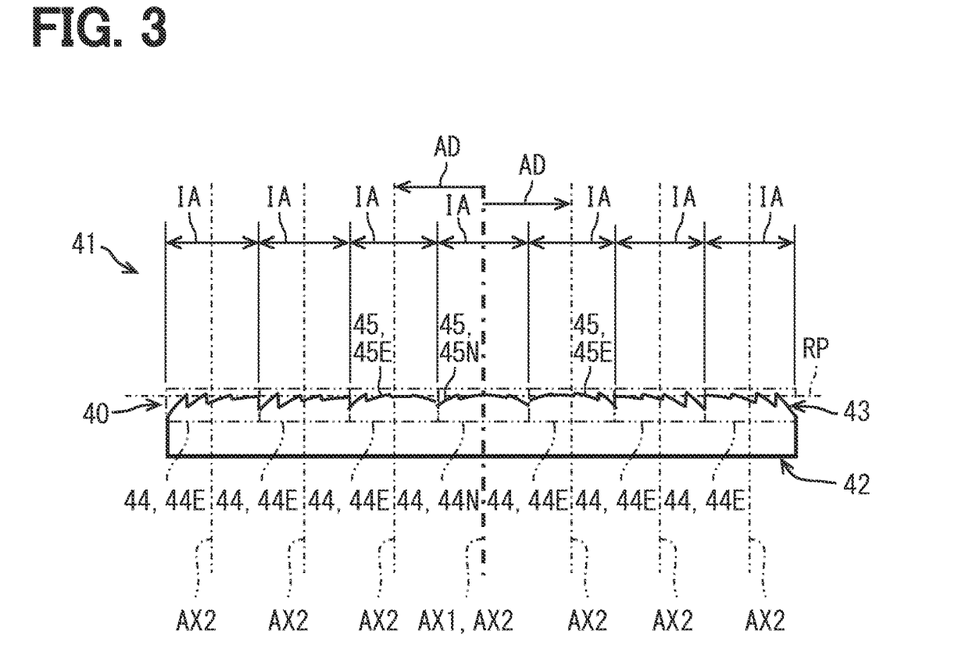
FIG. 3 is a cross-sectional view showing a second lens member in an enlarged manner.

As illustrated in an enlarged manner in FIG. 3, the second lens member 41 is a Fresnel lens array having an array structure 40 in which a plurality of (e.g., odd number, seven) Fresnel lens units 44 are arrayed. The second lens member 41 has an incident side lens surface 42 facing the first lens member 38 side formed into a common smooth planar shape between the Fresnel lens units 44. In the second lens member 41, the emission side lens surface 43 facing the diffusion plate 52 and the image member 54 side is formed in a composite surface shape including a plurality of divided surfaces. In this way, the array structure 40 is formed on the emission side lens surface 43 of the second lens member 41.

As will be described later, the second lens member 41 has a light collecting function of collecting the illumination light in the short corresponding direction RSD out of the short corresponding direction RSD and the longitudinal corresponding direction RLD. The second lens member 41 has an overall reference axis line AX1 that is defined as a virtual center line of the array structure 40 that passes through the array structure. The overall reference axis line AX1 is a virtual center line with respect to the entire array structure 40. The overall reference axis line AX1 is an axis corresponding to the optical axis of the second lens member 41 or the entire array structure 40. The overall reference axis line AX1 can be defined to lie along the light emission peak direction PD on a cross section in which the second lens member 41 exhibits a light collecting function, that is, a cross section including the center of the display screen 56, the short direction SD, and the short corresponding direction RSD. In the array structure 40 formed by the emission side lens surface 43 of the second lens member 41, both side parts sandwiching the overall reference axis line AX1 are formed in a linearly symmetric shape with the overall reference axis line AX1 as a symmetry axis.

On this cross section, the overall reference axis line AX1 is further disposed so as to pass through the center of the display screen 56. In addition, the overall reference axis line AX1 is arranged such that there is no shift in the short corresponding direction RSD with respect to the optical axis of each convex lens element 39, and the coordinates in the short corresponding direction RSD coincide with each other.

For example, in the present embodiment, the plurality of Fresnel lens units 44 are arrayed along a short corresponding direction RSD perpendicular to the longitudinal corresponding direction RLD in which the illumination light source 36 and the convex lens element 39 are arrayed. Each Fresnel lens unit 44 occupies an individual area IA as a region individually corresponding to each Fresnel lens unit in the array structure 40. In the present embodiment, each individual area IA is formed in an elongated stripe having a width in the short corresponding direction RSD and extending in the longitudinal corresponding direction RLD.

Each Fresnel lens unit 44 has a divided lens surface 45 dividedly formed in plurals (e.g., four). The divided lens surface 45 is divided to reduce a coordinate difference in a direction along the overall reference axis line AX1 due to a maximum sag amount and a minimum sag amount in each Fresnel lens unit 44. The spacing at which the divided lens surface 45 is divided along the perpendicular direction of the overall reference axis line AX1 may be an equal spacing or a spacing corresponding to the sag.

Each divided lens surface 45 is arranged such that, for example, the thickness of the second lens member 41 in the maximum sag amount portion in the individual area IA is substantially the same between the divided lens surfaces 45. Note that each divided lens surface 45 may be arranged such that, for example, the thickness of the second lens member 41 in the minimum sag amount portion in the individual area IA is substantially the same between the divided lens surfaces 45.

Here, the thickness at each portion of the second lens member 41 is defined as a distance from the incident side lens surface 42 to the emission side lens surface 43 along the perpendicular direction of the incident side lens surface 42. In this way, a step is formed between the divided lens surfaces 45 adjacent to each other.

In particular, in the present embodiment, the divided lens surface 45 is divided in the short corresponding direction RSD that exhibits a light collecting function. Therefore, each of the divided lens surfaces 45 is formed in stripes having a width narrower than that of each of the individual areas IA. Each of the Fresnel lens units 44 of the present embodiment can be said to be a linear Fresnel lens, and the second lens member 41 can be said to be a linear Fresnel lens array.

Each divided lens surface 45 in each Fresnel lens units 44 has a common curved shape out of a convex surface shape curved convexly or a concave surface shape curved concavely. In the present embodiment, as the common curved shape, a cylindrical surface having a convex surface shape curved convexly and having a curvature in the short corresponding direction RSD is adopted. The cylindrical surface referred to herein includes not only an authentic cylindrical surface having a constant curvature at each portion but also an aspherical cylindrical surface obtained by composing a correcting shape by an aspherical coefficient with the authentic cylindrical surface. However, in the present embodiment, an authentic cylindrical surface is adopted. Note that the curvature center CC of the divided lens surface 45 to be described later can be defined by approximating the curved shape to an arc when the curved shape is aspherical. The least squares method is used for approximation to the arc.

Each Fresnel lens unit 44 has its own individual center axis line AX2. The individual center axis line AX2 is an axis penetrating the center that equally divides the dimension of the individual area IA in the width direction (in other words, the short corresponding direction RSD) on the cross section, and can be defined as an axis parallel to the overall reference axis line AX1.

Figure 4:
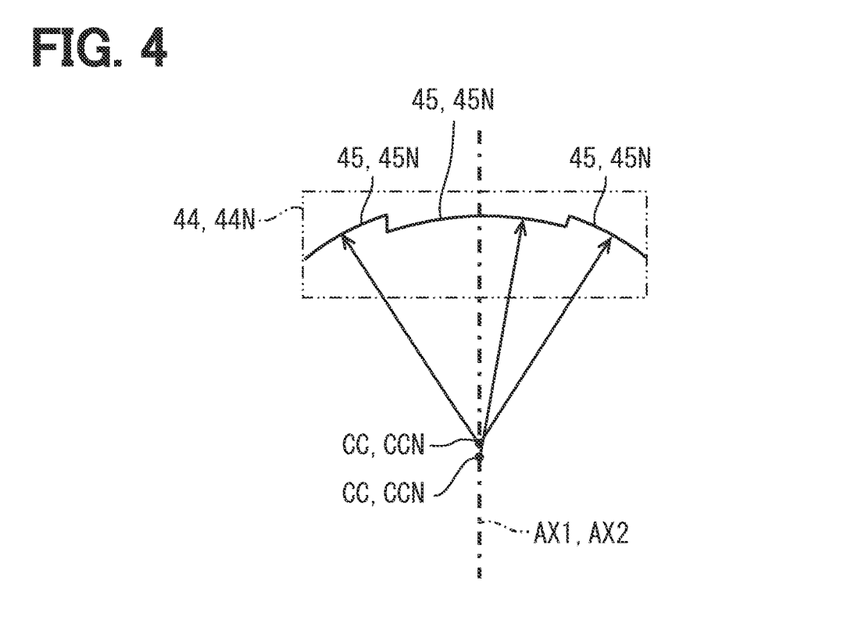
FIG. 4 is a view describing a paraxial Fresnel lens unit.

Among the odd-numbered Fresnel lens units 44 arrayed with each other, the paraxial Fresnel lens unit 44N arranged at the center has a mode in which the individual center axis line AX2 substantially coincides with the overall reference axis line AX1, as illustrated in FIG. 4. In the paraxial Fresnel lens unit 44N, both side parts sandwiching the individual center axis line AX2 in the width direction are formed in a linearly symmetric shape with the individual center axis line AX2 as a symmetry axis. The curvature center CCN of each divided lens surface 45N belonging to the paraxial Fresnel lens unit 44N is arranged on the overall reference axis line AX1 and the individual center axis line AX2. The curvature center CCN is shifted in the direction along the overall reference axis line AX1 and the individual center axis line AX2 between the respective divided lens surfaces 45N by a step formed between the divided lens surfaces 45N.

Figure 5:
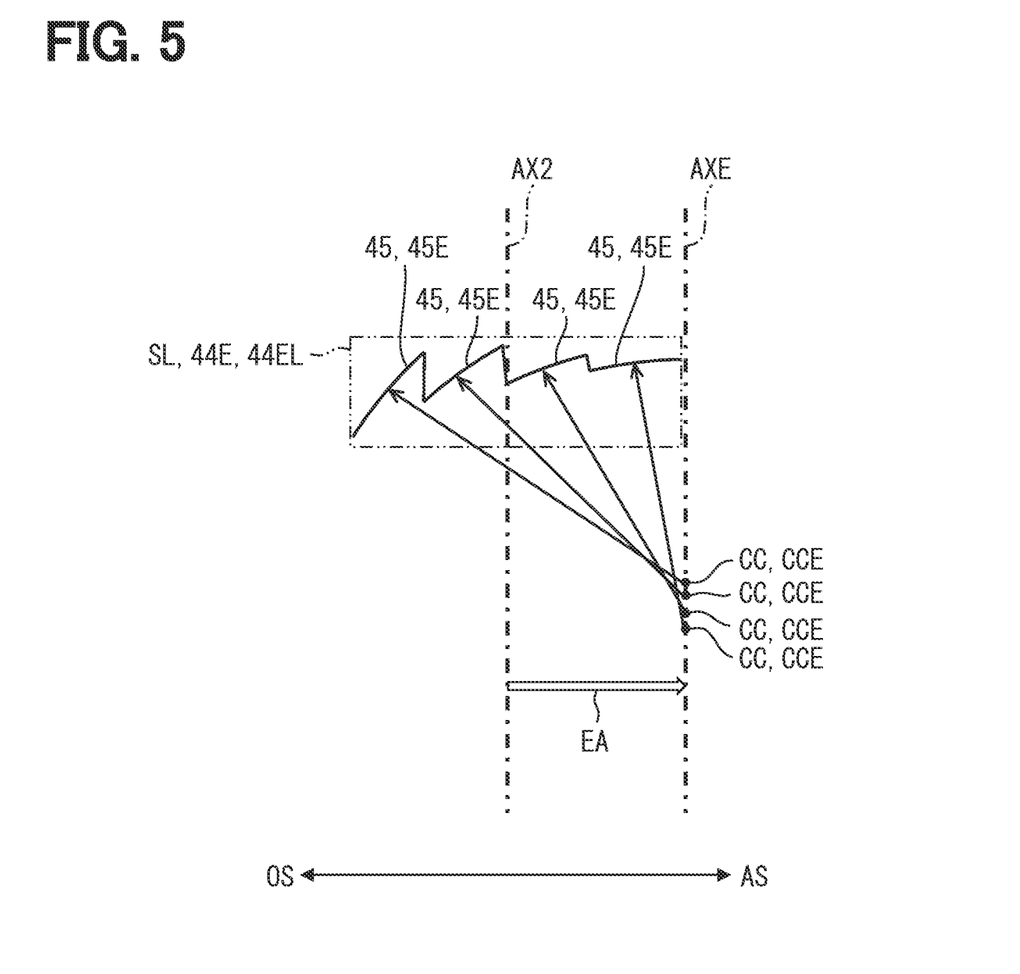
FIG. 5 is a view describing an eccentric Fresnel lens unit at a part on one side.
Figure 6:
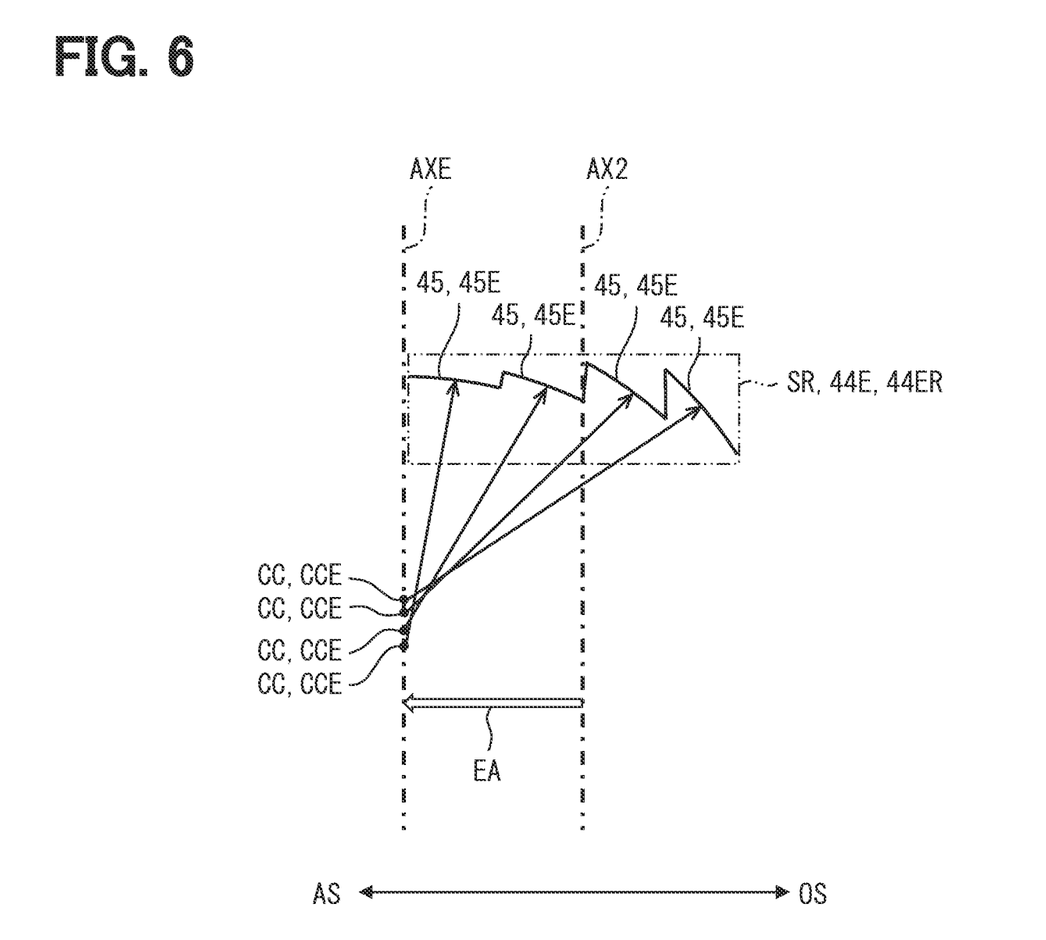
FIG. 6 is a view describing an eccentric Fresnel lens unit at a part on the other side.

Among the odd-numbered Fresnel lens units 44, a plurality of (e.g., six) eccentric Fresnel lens units 44E excluding the paraxial Fresnel lens unit 44N have a mode in which the individual center axis line AX2 is shifted with respect to the overall reference axis line AX1. The plurality of eccentric Fresnel lens units 44E are arrayed in an arrangement of sandwiching the paraxial Fresnel lens unit 44N from both sides. In the eccentric Fresnel lens unit 44E, both side parts sandwiching the individual center axis line AX2 are formed in an asymmetric shape. As illustrated in FIGS. 5 and 6, the curvature center CCE of each divided lens surface 45 belonging to the eccentric Fresnel lens unit 44E is eccentric to the same side that is an overall reference axis side AS of the individual center axis line AX2 that is close to the overall reference axis line AX1 or an opposite side OS of the individual center axis line AX2 that is away from the overall reference axis line AX1.

Here, the same side is commonly set with respect to all the divided lens surfaces 45N belonging to all the eccentric Fresnel lens units 44E. In the present embodiment, the overall reference axis side AS is adopted as the same side. Therefore, as illustrated in FIG. 5, in each eccentric Fresnel lens units 44ER arranged at one side SL of the overall reference axis line AX1 in the array structure 40, the curvature center CCE is offset from the respective individual center axis line AX2 toward the overall reference axis side AS, that is, toward the other side SR of the overall reference axis line AX1. As illustrated in FIG. 6, in each eccentric Fresnel lens unit 44EL arranged at the other side SR of the overall reference axis line AX1 in the second lens member 41, the curvature center CCE is offset from the respective individual center axis line AX2 toward the overall reference axis side AS, that is, toward the one side SL of the overall reference axis line AX1.

The curvature center CCE of each divided lens surface 45E belonging to the same eccentric Fresnel lens unit 44E is offset from the individual center axis line AX2 to the same side by a specific offset amount EA that is set every eccentric Fresnel lens units 44E, and is arranged on an eccentric axis AXE parallel to the individual center axis line AX2. The curvature center CCE is shifted in the direction along the eccentric axis AXE between the divided lens surfaces 45E by a step formed between the divided lens surfaces 45E.

The specific offset amount EA of the eccentric Fresnel lens units having a larger value of the inter-axis distance is greater than the specific offset amount of the eccentric Fresnel lens unis having a smaller value of the inter-axis distance. More preferably, the specific offset amount EA is set to be substantially proportional to the inter-axis distance AD.

Such an array structure 40 will be further described using a virtual base curved surface to become a base of the array structure 40. The array structure 40 of the present embodiment is a structure based on the composite of the convex array lens surface B1$p$ illustrated in FIG. 7 and the single-convex lens surface B2$p$ illustrated in FIG. 8. The convex array lens surface B1$p$ is a base curved surface in which a plurality of small convex lens surfaces Bsp having optical axes corresponding to the individual center axis line AX2 are arranged on a straight line. The single convex lens surface B2$p$ is configured by a single convex lens surface having an optical axis corresponding to the overall reference axis line AX1. The curvature radius of the small convex lens surface Bsp is set to be sufficiently smaller than the curvature radius of the single convex lens surface B2$p$. This is because a shorter focal length is usually expected to be set for the array-like lens.

Figure 9:
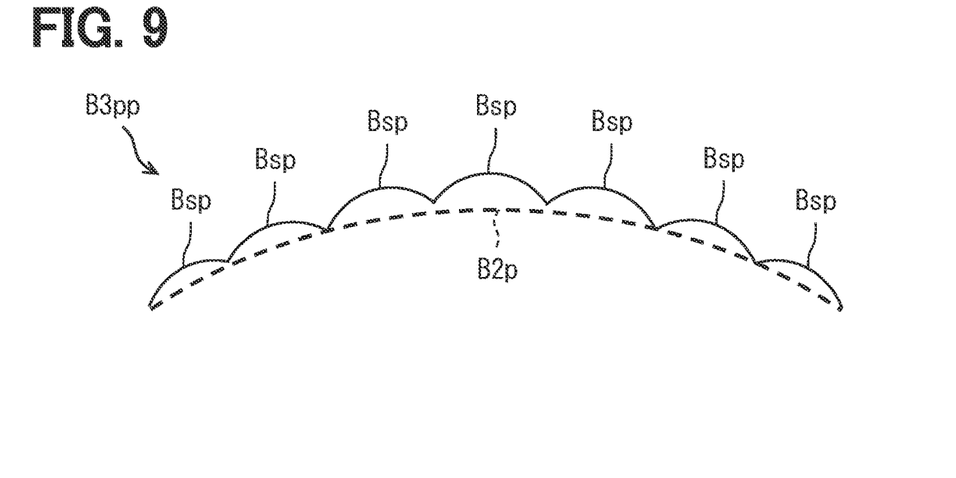
FIG. 9 is a view illustrating a composite lens surface.

As illustrated in FIG. 9, a composite lens surface B3$pp$ obtained by simply composing the convex array lens surface B1$p$ and the single convex lens surface B2$p$ has a shape in which the small convex lens surfaces Bsp arrayed on a straight line in the convex array lens surface B1$p$ are re-arrayed on a curve of the single convex lens surface B2$p$. Each small convex lens surface Bsp is in a state in which both side parts sandwiching the optical axis specific to the small convex lens surface Bsp are formed in an asymmetric shape by lying along the single convex lens surface B2$p$. In each small convex lens surface Bsp, the curvature center is eccentric toward the optical axis side of the original single convex lens surface B2$p$ with respect to the respective optical axis.

However, in the composite lens surface B3$pp$, since the plurality of small convex lens surfaces Bsp having a short focal length move back and forth in the direction along the optical axis, the focal positions of the plurality of small convex lens surfaces Bsp also move back and forth in the direction along the optical axis. If a lens member in which the composite lens surface B3$pp$ is appeared as it is adopted with respect to the planar light source arrangement surface LP, the focal position of each of the small convex lens surfaces Bsp has a non-uniform positional relationship with respect to the light source arrangement surface LP. Therefore, the local light collecting function of the illumination light expected on each of the small convex lens surfaces Bsp of the original convex array lens surface B1$p$ cannot be uniformly exhibited on a light receiving surface 55 and a display screen 56 of the image member 54.

Figure 10:
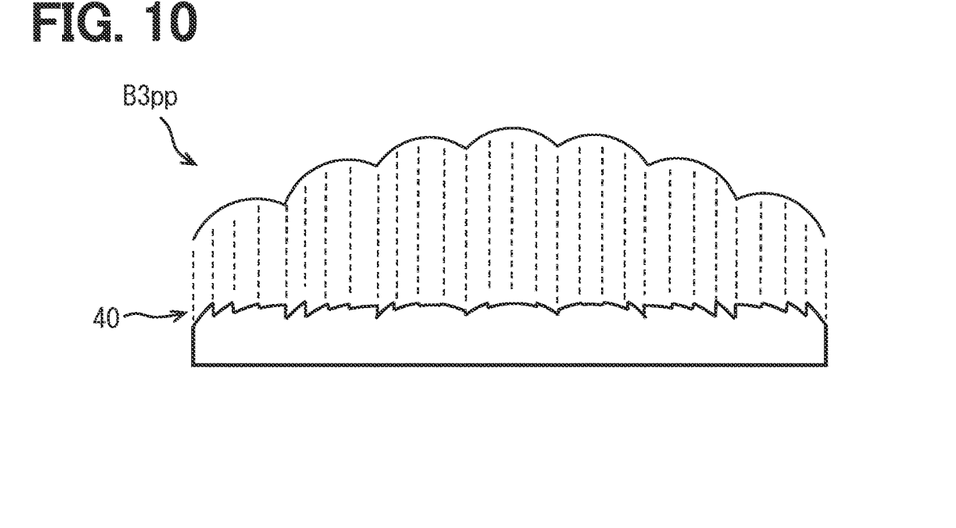
FIG. 10 is a view describing a Fresnel lens of the composite lens surface.

Therefore, in the present embodiment, as illustrated in FIG. 10, the entire composite lens surface B3$pp$ is formed into a Fresnel lens to form the macroscopically flat-plate shaped second lens member 41 described above. That is, the continuous composite lens surface B3$pp$ appears in the array structure 40 in a mode in which its partial shape is copied and divided into the divided lens surfaces 45. Each small convex lens surface Bsp in the base curved surface (synthetic lens surface B3$pp$) corresponds to each Fresnel lens unit 44 of the array structure 40.

Each of the Fresnel lens units 44 has a configuration in which each of the divided lens surfaces 45 is arranged along a reference plane RP commonly set among the Fresnel lens units 44 so to as lie along the parallel direction of the light source arrangement surface LP. Since each focal point that can be defined in each Fresnel lens unit 44 is adjusted in the direction along the overall reference axis line AX1, the local light collecting function of the illumination light can be more uniformly realized in accordance with the planar light source arrangement surface LP.

Then, each small convex lens surface Bsp is extracted in a mode of being divided into each divided lens surface 45 in each Fresnel lens unit 44 while maintaining the above-described asymmetric shape. As a result, the overall light collecting function expected on the original single convex lens surface B2$p$ can be simultaneously exhibited.

As illustrated in FIG. 2, the diffusion plate 52 is disposed between the second lens member 41 and the image member 54 on the optical path between the light source unit 34 and the image member 54. The diffusion plate 52 is formed in a flat plate shape by dispersing diffusion particles such as microbeads in a base material made of, for example, a translucent synthetic resin. For example, the diffusion plate 52 is disposed along the parallel direction of the image member 54 so as to keep a constant spacing from the light receiving surface 55 of the image member 54. In other words, the diffusion plate 52 is disposed to be inclined with respect to the light source arrangement surface LP. The diffusion plate 52 appropriately diffuses the illumination light subjected to the local light collecting action immediately before the image member 54.

The image member 54 is formed into a panel shape (flat plate shape). The image member 54 is a transmissive TFT liquid crystal panel using a thin film transistor (Thin Film Transistor, TFT), and is, for example, an active matrix liquid crystal panel in which a plurality of liquid crystal pixels arrayed in a two-dimensional array are formed.

The image member 54 is formed with an optical opening that is formed to be able to transmit light and is optically opened. The optical opening is formed in a square shape having the longitudinal direction LD and the short direction SD, that is, a rectangular shape in a mode in which the liquid crystal pixels are arranged as described above.

A surface facing the light guide unit 21 side in the optical opening is a display screen 56 that displays an image. On the other hand, a surface facing the light source unit 34 side in the optical opening is a light receiving surface 55 that receives the illumination light.

The entire surface of the optical opening is closed by stacking a pair of polarizing plates, a liquid crystal layer sandwiched between the pair of polarizing plates, and the like. Each polarizing plate has a transmission axis and an absorption axis orthogonal to each other. Each polarizing plate has a property of transmitting light polarized in the transmission axis direction and absorbing light polarized in the absorption axis direction. The pair of polarizing plates are arranged to be respectively orthogonal to the transmission axis. The liquid crystal layer can rotate the polarization direction of the light entering the liquid crystal layer according to the applied voltage by applying the voltage for every liquid crystal pixel. In this way, the image member 54 can change the ratio of light transmitting through the polarizing plate on the light guide unit 21 side by the rotation of the polarization direction, that is, the transmittance for every liquid crystal pixel.

Therefore, the image member 54 can form an image on the display screen 56 by shielding at least a part of the illumination light emitted from the light source unit 34 and received by the light receiving surface 55. Adjacent liquid crystal pixels are provided with color filters of different colors (e.g., red, green and blue), and various colors are reproduced by a combination thereof.

In the present embodiment, the display screen 56 and the light receiving surface 55 of the image member 54 are arranged to be inclined with respect to the surface of the light source circuit substrate 35, in other words, the light source arrangement surface LP. Specifically, the image member 54 is arranged in an inclined posture in which the display screen 56 and the light receiving surface 55 are rotated by an inclination angle of about 10 to 20 degrees around a virtual rotation axis that lies along the longitudinal direction LD of the display screen 56 and passes through the center of the display screen 56 from a virtual parallel posture that lies along the parallel direction of the light source arrangement surface LP. Therefore, in the present embodiment, the longitudinal corresponding direction RLD substantially coincides with the longitudinal direction LD, and the short corresponding direction RSD forms the same angle as this inclination angle with the short direction SD.

Operation and Effect

The operation and effect according to the first embodiment described above will be described again below.

According to the first embodiment, the second lens member 41 serving as a Fresnel lens array having the array structure 40 in which the plurality of Fresnel lens units 44 are arrayed is provided between the illumination light source 36 and the image member 54. Each Fresnel lens unit 44 dividedly forms a plurality of divided lens surfaces 45 having a common curved shape in its individual area IA. A local refraction action as if each individual center axis line AX2 is the optical axis is exhibited by the common curved shape while enlargement of the build of the lens member 41 due to bulging out of the lens surface by division is suppressed.

The Fresnel lens unit 44 includes a plurality of eccentric Fresnel lens units 44E. Each eccentric Fresnel lens units 44E has, as an eccentricity amount eccentric to the same side (e.g., the overall reference axis side AS), an offset amount EA that gradually increases as the inter-axis distance AD between the individual center axis line AX2 and the overall reference axis line AX1 increases. That is, since the illumination light passing through the position away from the overall reference axis line AX1 receives a larger deflection action, the overall refracting function as if the overall reference axis line AX1 is the optical axis can be further exhibited by the assembly of the plurality of eccentric Fresnel lens units 44E.

Since the same array structure 40 exhibits both the local refracting function and the overall refracting function, an increase in the number of components is suppressed. As described above, the build of the HUD 10 serving as the virtual image display device can be suppressed while achieving high illumination performance.

According to the first embodiment, the Fresnel lens unit 44 further includes one paraxial Fresnel lens unit 44N. The paraxial Fresnel lens unit 44N coincides the individual center axis line AX2 with the overall reference axis line AX1, and locates the curvature center CCN on the individual center axis line AX2. The paraxial portion in the overall refracting function based on the overall reference axis line AX1 appears as a paraxial Fresnel lens unit 44N. When the paraxial portion exhibits a refracting function in a favorable state, the generated amount of aberration outside a lens axis is reduced, and the illumination performance is further enhanced.

Furthermore, according to the first embodiment, the paraxial Fresnel lens unit 44N has a symmetric shape with the individual center axis line AX2 as a symmetry axis, and each eccentric Fresnel lens unit 44E has an asymmetric shape with respect to the corresponding individual center axis line AX2. The overall refracting function having the overall reference axis line AX1 as the pseudo optical axis can be easily realized by combining the Fresnel lens unit 44N having a symmetric shape and the Fresnel lens unit 44E having an asymmetric shape.

Furthermore, according to the first embodiment, each Fresnel lens units 44 has a configuration in which the divided lens surface 45 is arranged along the reference plane RP commonly set among the Fresnel lens units 44 so as to lie along the parallel direction of the light source arrangement surface LP. Then, the positional relationship between the planar light source arrangement surface LP and the focal position of each Fresnel lens unit 44 can be made uniform over the entire illumination system. Therefore, a more uniform illumination to the image member 54 can be realized.

According to the first embodiment, the common curved shape of each Fresnel lens unit 44 is a convex surface shape curved convexly, and the same side is the overall reference axis side AS. Such an array structure 40 can realize a local light collecting function corresponding to each individual center axis line AX2 and an overall light collecting function corresponding to the overall reference axis line AX1. The local light collecting function enhances the efficiency of illumination from the illumination light source 36 to the image member 54, and raises the luminance of the virtual image VRI. Further. Since the illumination light is concentrated on the viewing region EB by the overall light collecting function, the luminance of the virtual image VRI visually recognized from the viewing region EB can be further increased. As described above, high illumination performance can be achieved with a configuration in which the increase in build due to the increase in the number of components is suppressed.

Second Embodiment

As illustrated in FIGS. 7 and 11 to 14, the second embodiment is a modification of the first embodiment. The second embodiment will be described focusing on differences from the first embodiment.

Figure 7:
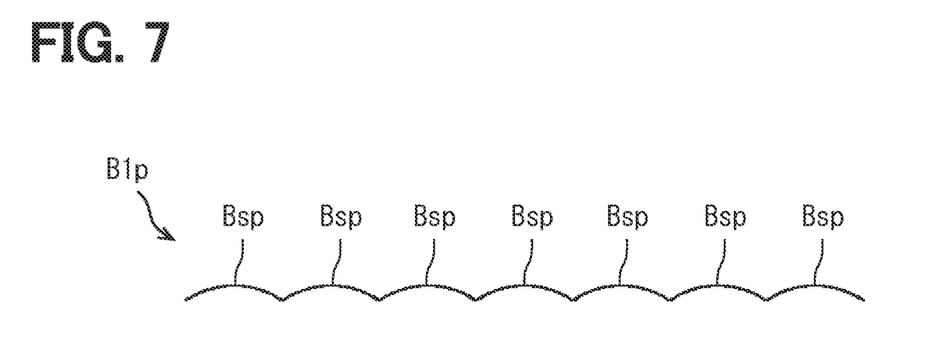
FIG. 7 is a view illustrating a convex array lens surface.
Figure 8:
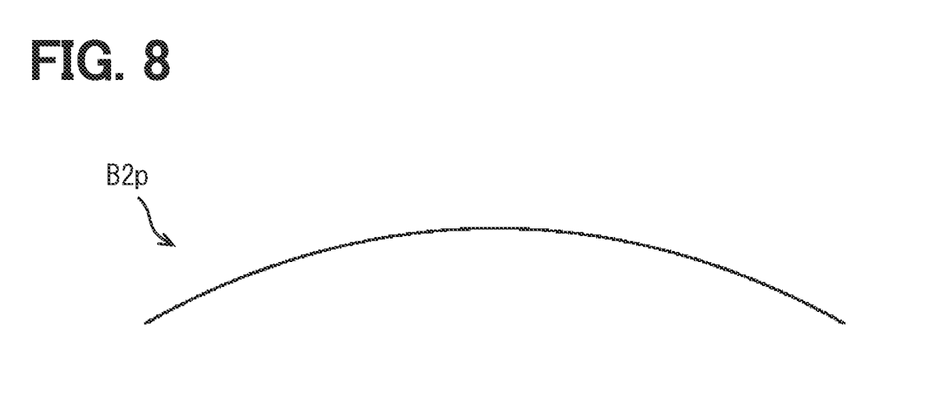
FIG. 8 is a view illustrating a single convex lens surface.
Figure 11:
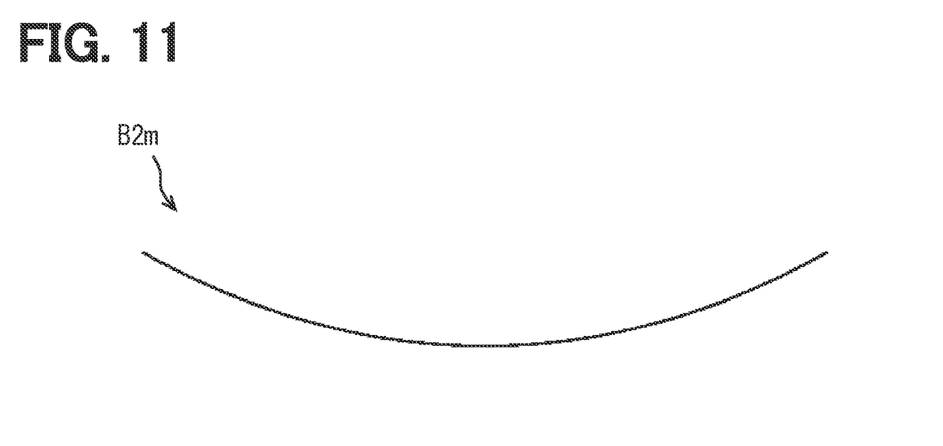
FIG. 11 is a view illustrating a single concave array lens surface of a second embodiment.

An array structure 240 in the second embodiment is a structure based on the composite of the convex array lens surface B1p illustrated in FIG. 7 and the single-concave lens surface B2m illustrated in FIG. 11. The convex array lens surface B1p is similar to that of the first embodiment. The single concave lens surface B2m is configured by a single concave lens surface having an optical axis corresponding to the overall reference axis line AX1.

Figure 12:
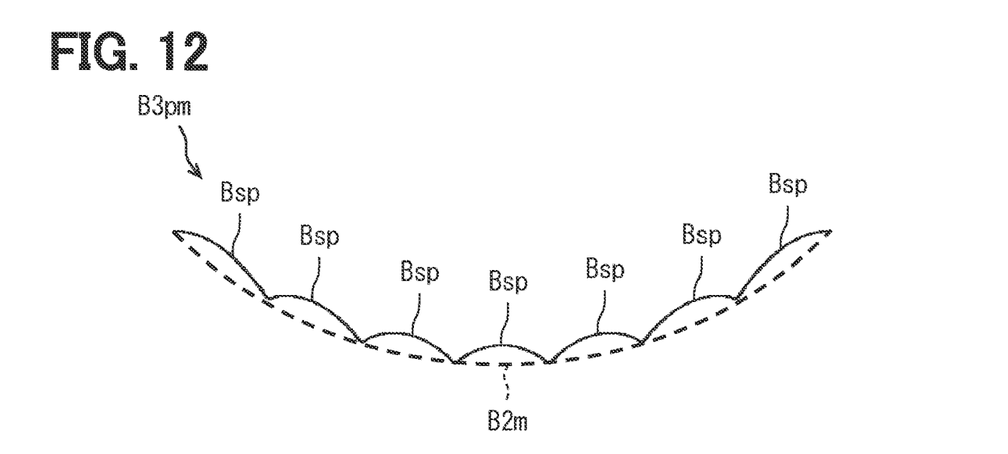
FIG. 12 is a view illustrating a composite lens surface of the second embodiment.

As illustrated in FIG. 12, a composite lens surface B3pm obtained by simply composing the convex array lens surface B1p and the single concave lens surface B2m has a shape in which the small convex lens surfaces Bsp arrayed on a straight line in the convex array lens surface B1p are re-arrayed in a curve of the single concave lens surface B2m. Each small convex lens surface Bsp is in a state in which both side parts sandwiching the optical axis of the small convex lens surface Bsp are formed in an asymmetric shape by lying along the single concave lens surface B2m. In each small convex lens surface Bsp, the curvature center is eccentric toward the side opposite to the optical axis side of the original single concave lens surface B2m with respect to the respective optical axis.

Figure 13:
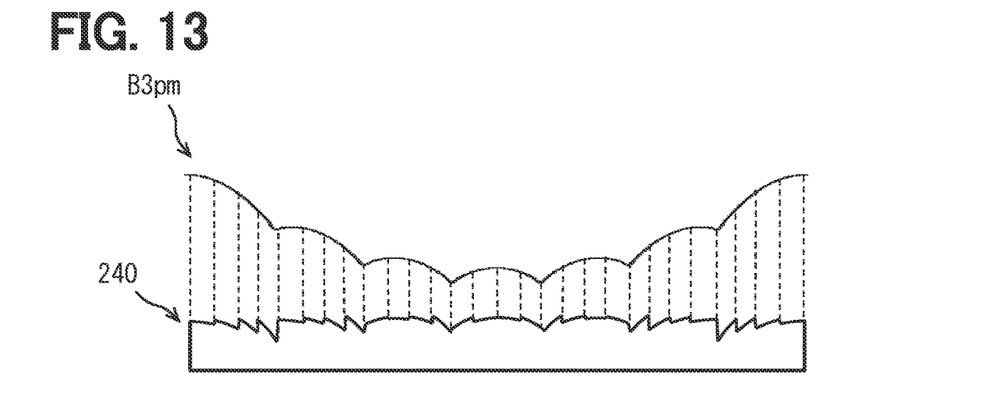
FIG. 13 is a view corresponding to FIG. 10 in the second embodiment.

The entire composite lens surface B3pm described above is formed into a Fresnel lens as illustrated in FIG. 13, thereby forming an array structure 240 in which a plurality of Fresnel lens units 244 having a plurality of divided lens surfaces 245 are arranged in the second embodiment.

Figure 14:
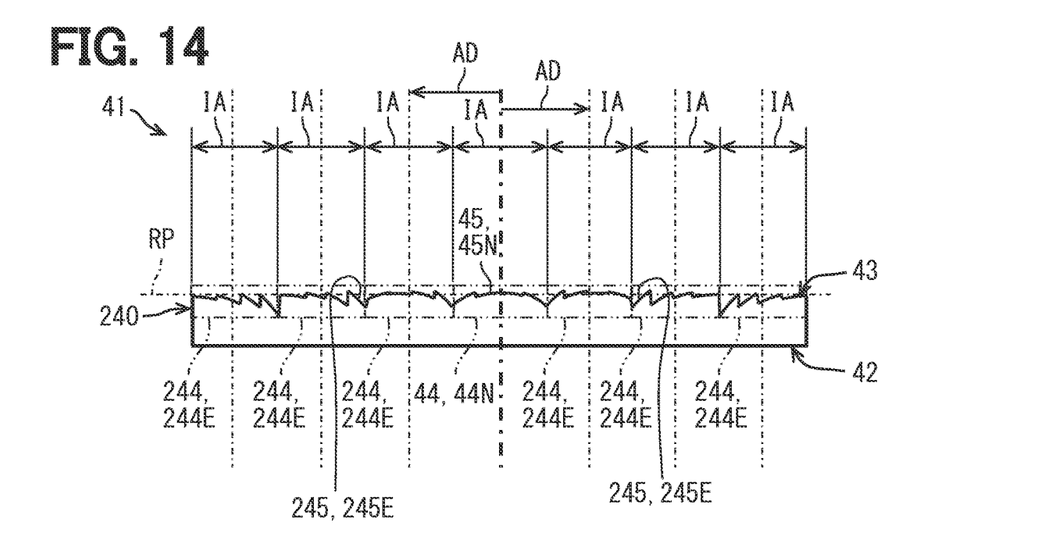
FIG. 14 is a view corresponding to FIG. 3 in the second embodiment.

As illustrated in FIG. 14, in the array structure 240, the paraxial Fresnel lens unit 44N has a structure similar to that of the first embodiment.

Figure 15:
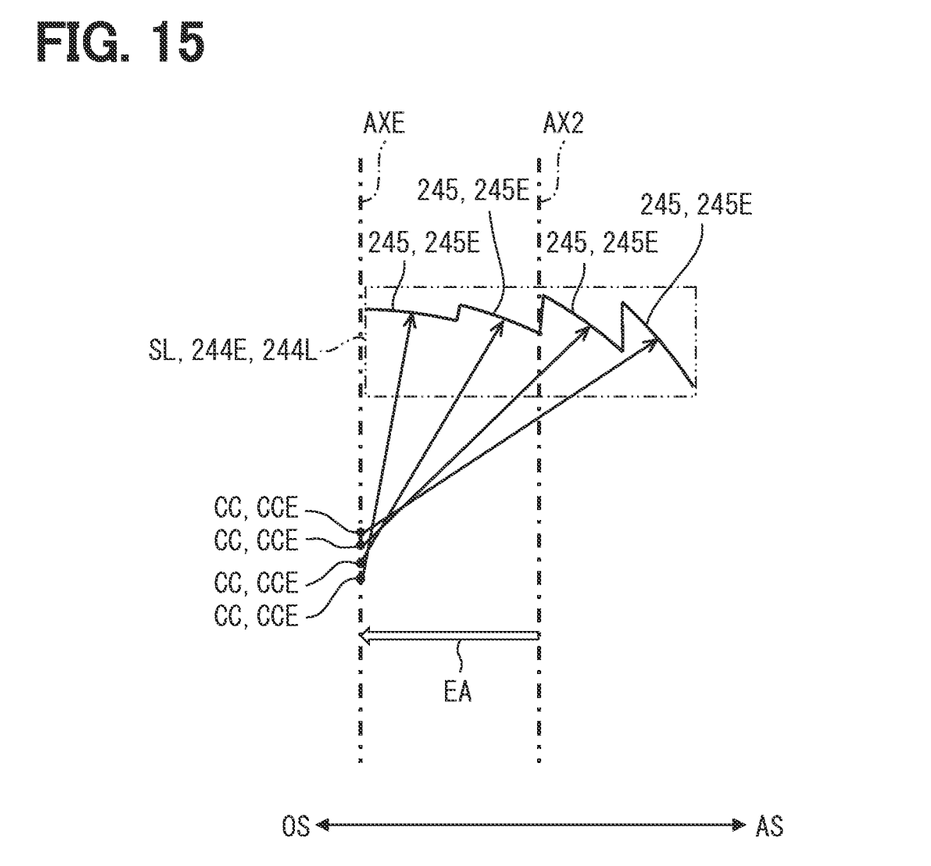
FIG. 15 is a view corresponding to FIG. 5 in the second embodiment.
Figure 16:
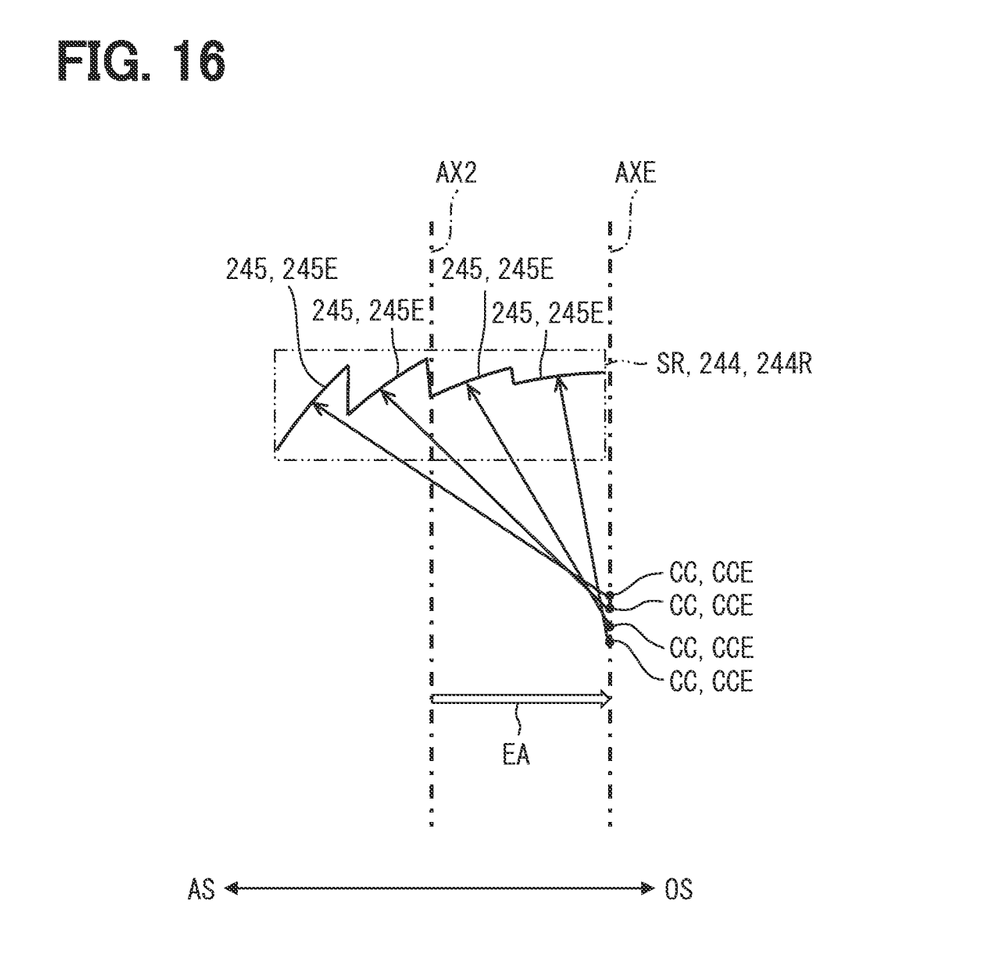
FIG. 16 is a view corresponding to FIG. 6 in the second embodiment.

As illustrated in FIGS. 15 and 16, the curvature center CCE of each divided lens surface 245E belonging to the eccentric Fresnel lens unit 244E is eccentric to the same side of the overall reference axis side AS and the opposite side OS thereof with respect to the individual center axis line AX2.

However, the second embodiment is different from the first embodiment in that the opposite side OS to the overall reference axis line AX1 is adopted as the same side. In each eccentric Fresnel lens unit 244EL arranged at the one side SL of the overall reference axis line AX1 in the array structure 240, the curvature center CCE is offset from the respective individual center axis line AX2 toward the opposite side OS opposite to the overall reference axis line AX1, that is, toward the side away from the other side SR of the overall reference axis line AX1. In each eccentric Fresnel lens unit 244ER arranged at the other side SR of the overall reference axis line AX1 in the array structure 240, the curvature center CCE is offset from the respective individual center axis line AX2 toward the opposite side OS opposite to the overall reference axis line AX1, that is, toward the side away from the one side SL of the overall reference axis line AX1.

The offset amount EA specific to each eccentric Fresnel lens unit 244E is set so as to gradually increase as the inter-axis distance AD increases. More preferably, the specific offset amount EA is set to be substantially proportional to the inter-axis distance AD.

According to the second embodiment described above, the array structure 240 can realize a local light collecting function corresponding to each individual center axis line AX2 and an overall diverging function corresponding to the overall reference axis line AX1. The local light collecting function enhances the efficiency of illumination from the illumination light source 36 to the image member 54, and raises the luminance of the virtual image VRI. Since the illumination light can widely reach the viewing region EB by the overall diverging function, luminance unevenness of the virtual image VRI felt by the viewer when the head is moved can be suppressed. As described above, high illumination performance can be achieved with a configuration in which the increase in build due to the increase in the number of components is suppressed.

Other Embodiment

Although a plurality of embodiments have been described above, the present disclosure is not to be construed as being limited to these embodiments, and can be applied to various embodiments and combinations within a scope not deviating from the gist of the present disclosure.

Specifically, as a first modification, the plurality of Fresnel lens units 44, 244 in the array structure 40, 240 may be arrayed along the longitudinal corresponding direction RLD. In addition, the convex array lens surface B1$p$ in the base curved surface can be expanded to a shape in which the small convex lens surfaces Bsp are two-dimensionally arrayed. In this case, the plurality of Fresnel lens units 44, 244 in the array structure 40, 240 may be two-dimensionally arrayed.

As a second modification, the plurality of Fresnel lens units 44, 244 may be arranged concentrically centered on the overall reference axis line AX1 to exhibit a refracting function in both the short corresponding direction RSD and the longitudinal corresponding direction RLD. The concentric circle herein may be a perfect circle or an ellipse as long as it is a circle centered on the overall reference axis line AX1.

As a third modification, the paraxial Fresnel lens unit 44N may not be provided. For example, when an even number of Fresnel lens units 44, 244 are provided and the overall reference axis line AX1 is set so as to pass through the boundary between the Fresnel lens units 44, 244 adjacent to each other at the center, all the Fresnel lens units 44, 244 correspond to the eccentric Fresnel lens units 44E, 244E.

As a fourth modification, the array structure 40, 240 may be formed on the incident side lens surface 42.

As a fifth modification, the array structure 40, 240 may be a structure based on composite of the concave array lens surface and the single convex lens surface B2$p$ or the single concave lens surface B2$m$. In this case, the curved shape common to the plurality of divided lens surfaces 45N, 45E, and 245E is, for example, a concave surface shape curved to a concave shape such as a concave cylindrical surface or a concave spherical surface. Then, a diverging function is exhibited as a local refracting function.

As a sixth modification, the curved shape common to the plurality of divided lens surfaces 45N and 45E may be made aspherical by composing the correcting shapes by the aspherical coefficient. In this case, the curvature center CCN of the divided lens surface 45N may deviate from the overall reference axis line AX1 and the individual center axis line AX2. The curvature centers CCE of the divided lens surfaces 45E, 245E may not be located on the same eccentric axis AXE. When the eccentricity amount differs between the divided lens surfaces 45E, 245E belonging to the same Fresnel lens unit 44E and 244E, the offset amount EA specific to the Fresnel lens units 44E, 244E may be defined using the average value of the individual eccentricity amount with respect to the divided lens surfaces 45E, 245E as a representative value.

As a seventh modification, each illumination light source 36 forming a pair facing each convex lens element 39 may have a configuration that mainly includes an assembly of a plurality of light emitting diodes instead of one light emitting diode. The assembly may be configured to be regarded as a planar light source by assembling the point light sources.

As an eighth modification, the array pitch of the convex lens elements 39 in the first lens member 38 may be set to be larger than the array pitch of the illumination light sources 36. The convex lens element 39 on the outer side may be slightly shifted with respect to the paired illumination light source 36.

As a ninth modification, a configuration in which only one illumination light source 36 is provided may be adopted. In this case, one illumination light source 36 may be a planar light source or regarded as a planar light source to constitute the planar light source arrangement surface LP.

In a tenth modification, as the lens member disposed between the light source unit 34 and the image member 54, the convex lens array such as the first lens member 38 may not be provided and only the Fresnel lens array such as the second lens member 41 may be provided. In this case, the plurality of Fresnel lens units 44, 244 in the array structure 40, 240 of the Fresnel lens array may be provided as many as the illumination light sources 36, and each Fresnel lens unit 44, 244 may be paired with the individually corresponding illumination light source 36. In this case, the individual region ID of each Fresnel lens unit 44, 244 may be arranged to face the corresponding illumination light source 36.

As an eleventh modification, as a lens member disposed between the light source unit 34 and the image member 54, a lens member different from the first lens member 38 and the second lens member 41 may be added.

As a twelfth modification, the diffusion plate 52 may be disposed to be inclined with respect to image member 54. For example, the diffusion plate 52 may be disposed along a parallel direction of the light source arrangement surface LP and the reference plane RP. Further, the diffusion plate 52 itself may not be provided.

As a thirteenth modification, the image member 54 may be arranged in a parallel posture along the parallel direction of the light source arrangement surface LP and the reference plane RP.

As a fourteenth modification, the light guide unit 21 may have a configuration including a convex surface mirror having a reflecting surface of convex surface shape instead of the plane mirror 22. The light guide unit 21 may have a configuration including a lens, a prism, a holographic optical element, and the like.

As a fifteenth modification, the virtual image display device can be applied to various types of vehicles such as an aircraft, a ship, and a game housing. Furthermore, the virtual image display device can be applied to a portable information terminal such as a head mount display.

What is claimed is:

1. A virtual image display device that displays a virtual image by projecting light of an image onto a projection portion, the virtual image display device comprising:
   a light source that emits the light;
   an image member that forms the image by partially shielding the light; and
   a Fresnel lens array arranged in an optical path between the light source and the image member and having an array structure in which a plurality of Fresnel lens units are arrayed, each of the plurality of Fresnel lens units having an individual area, wherein
   an overall reference axis line is defined as a virtual center line of the array structure that passes through the array structure, an individual center axis line is defined as a center line of the individual area that is parallel to the overall reference axis line and passes through the individual area, each of the plurality of Fresnel lens units includes a plurality of divided lens surfaces, the plurality of divided lens surfaces curving convexly or the plurality of divided lens surfaces curving concavely, the array structure includes a plurality of eccentric Fresnel lens units as the plurality of Fresnel lens units, the plurality of divided lens surfaces of each of the plurality of eccentric Fresnel lens units have curvature centers that are offset from the individual center axis line toward a same side of the individual center axis line, the same side being an overall reference axis side of the individual center axis line that is close to the overall reference axis line or an opposite side of the individual center axis line that is away from the overall reference axis line, the curvature center of each divided lens surface belonging to the same eccentric Fresnel lens unit is offset from the individual center axis line by a specific offset amount that is set every eccentric Fresnel lens unit, an inter-axis distance is defined as a distance between the overall reference axis line and the individual center axis line, the specific offset amount of the eccentric Fresnel lens units having a larger value of the inter-axis distance is greater than the specific offset amount of the eccentric Fresnel lens units having a smaller value of the inter-axis distance, and a composite lens surface including a convex array lens surface and a single convex lens surface, the convex array lens surface including a plurality of small convex lens surfaces arrayed on a curve of the single convex lens surface, a curvature radius of each of the plurality of small convex lens surfaces being smaller than a curvature radius of the single convex lens surface.

2. The virtual image display device according to claim 1, wherein the array structure further includes a single paraxial Fresnel lens unit as one of the plurality of Fresnel lens units, the individual center axis line of the single paraxial Fresnel lens unit is coaxial with the overall reference axis line, and the plurality of divided lens surfaces of the single paraxial Fresnel lens unit have curvature centers located on the individual center axis line.

3. The virtual image display device according to claim 1, wherein the light source emits the light from a light source arrangement surface that has a planer shape, a reference plane is set among the plurality of Fresnel lens units to be parallel to the light source arrangement surface, and the plurality of divided lens surfaces are arranged along the reference plane.

4. The virtual image display device according to claim 1, wherein the plurality of divided lens surfaces curve convexly, and the curvature centers of the plurality of divided lens surfaces of each of the plurality of eccentric Fresnel lens units are offset from the individual center axis line toward the opposite side of the individual center axis line that is away from the overall reference axis line.

5. The virtual image display device according to claim 1, wherein the plurality of divided lens surfaces curve convexly, and the curvature centers of the plurality of divided lens surfaces of each of the plurality of eccentric Fresnel lens units are offset from the individual center axis line toward the overall reference axis side.

6. The virtual image display device according to claim 1, wherein the image member is a panel having a flat plate shape.

7. The virtual image display device according to claim 1, wherein the entire composite lens surface is formed by the plurality of Fresnel lens units to form the Fresnel lens array.

8. The virtual image display device according to claim 1, wherein each of the plurality of small convex lens surfaces corresponds to each of the plurality of Fresnel lens units of the array structure.

9. The virtual image display device according to claim 6, wherein the image member is a transmissive TFT liquid crystal panel using a thin film transistor.

10. The virtual image display device according to claim 2, wherein the single paraxial Fresnel lens unit has a symmetric shape with respect to the individual center axis line as a symmetry axis, and each of the plurality of eccentric Fresnel lens units has an asymmetric shape with respect to the individual center axis line.

11. The virtual image display device according to claim 2, wherein the curvature center of each divided lens surface belonging to the single paraxial Fresnel lens unit is arranged on the individual center axis line.

* * * * *